O. RANNEFELD.
INSECT DESTROYER.
APPLICATION FILED DEC. 24, 1920.
1,402,960.
Patented Jan. 10, 1922.
2 SHEETS—SHEET 1.
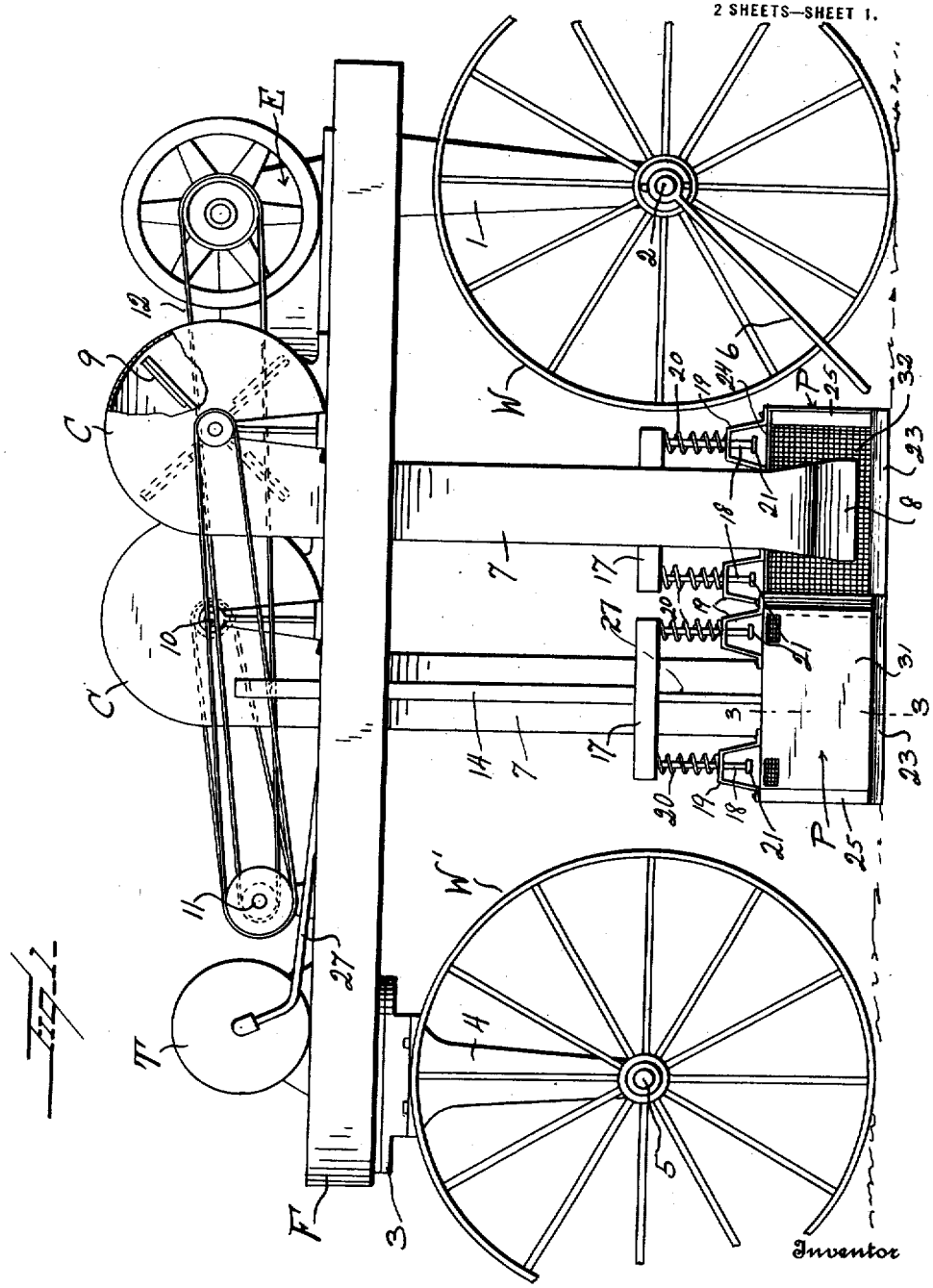
Inventor
O. Rannefeld
By Watson E. Coleman
Attorney

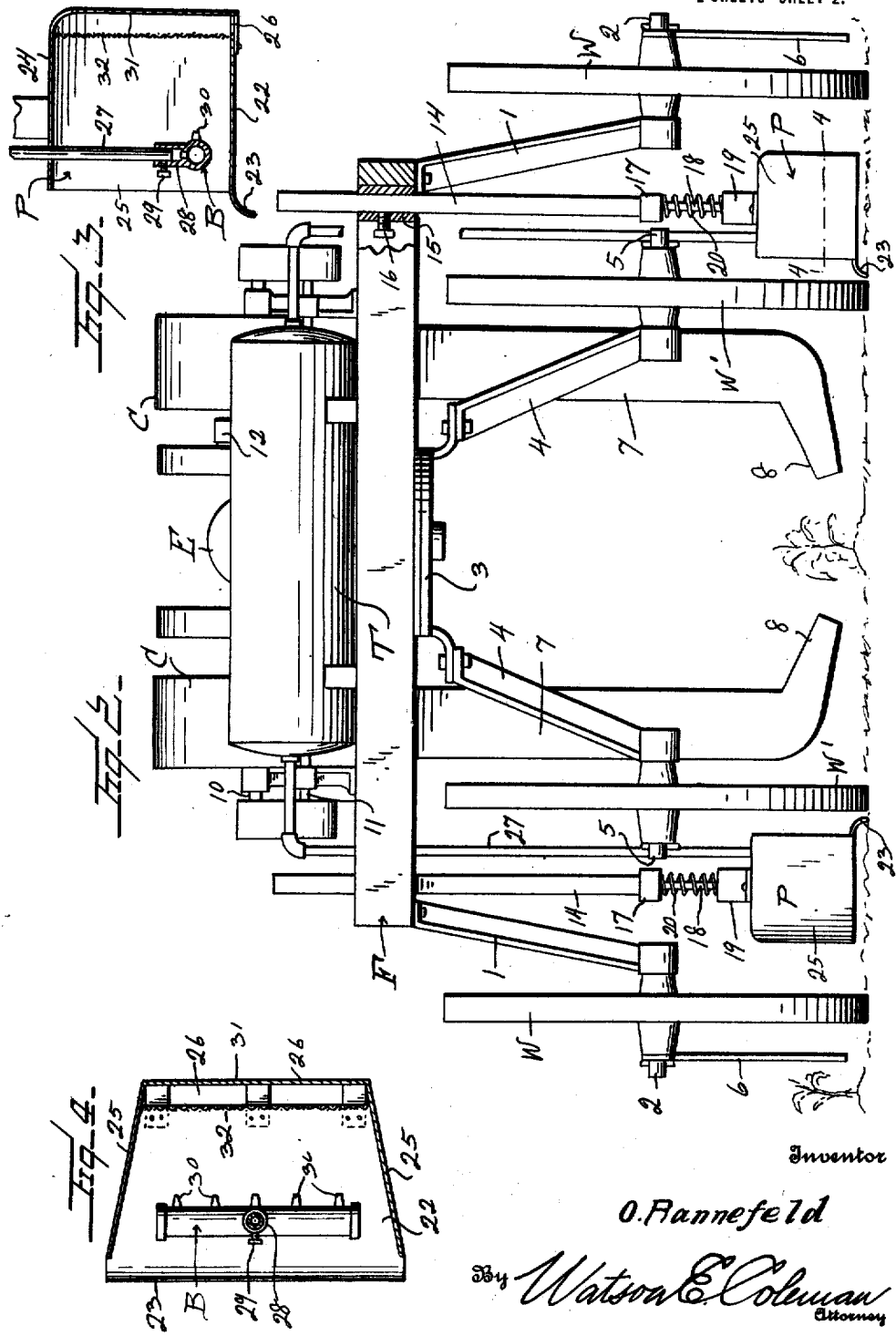

UNITED STATES PATENT OFFICE.

OTTO RANNEFELD, OF SHERWOOD, TEXAS, ASSIGNOR OF ONE-FOURTH TO ROBERT F. HALBERT, OF SAN ANGELO, TEXAS.

INSECT DESTROYER.

1,402,960.

Specification of Letters Patent. Patented Jan. 10, 1922.

Application filed December 24, 1920. Serial No. 432,992.

*To all whom it may concern:*

Be it known that I, OTTO RANNEFELD, a citizen of the United States, residing at Sherwood, in the county of Irion and State of Texas, have invented certain new and useful Improvements in Insect Destroyers, of which the following is a specification, reference being had to the accompanying drawings.

This invention relates to insect destroyers and has relation more particularly to a device of this general character especially designed and adapted for use in the extermination of boll weevils and kindred life, and it is an object of the invention to provide a novel and improved device of this general character wherein heat is employed as the life exterminating agency.

Another object of the invention is to provide a novel and improved device of this general character comprising a portable member adapted to travel along a row of plants with a pan or hood positioned to one side of said row, together with pneumatic means for dislodging the boll weevils or the like from the plants and directing the same within the pan or hood, said pan or hood being provided with a discharging agency for said insects.

The invention consists in the details of construction and in the combination and arrangement of the several parts of my improved insect destroyer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a side elevation of an insect destroyer embodying my invention,

Fig. 2 is a front view thereof,

Fig. 3 is a detail sectional view on the line 3—3 of Fig. 1, and

Fig. 4 is a similar view on the line 4—4 of Fig. 2.

As disclosed in the accompanying drawings, F denotes a frame of predetermined dimensions and configuration and which is provided at its opposite sides adjacent its rear portion with depending standards 1. The lower portion of each of the standards 1 is provided with a spindle 2 on which is mounted a supporting wheel W.

Operatively engaged with the forward portion of the frame F at substantially its transverse center is a fifth wheel 3 from which depend the standards 4. The lower end portion of each of the standards 4 is provided with a spindle 5 on which is mounted a supporting wheel W'. The wheels W' permit the frame F to be readily and conveniently steered in accordance with the requirements of practice. It is to be understood that the device is adapted to be drawn in any suitable manner but preferably by a double team of draft animals.

The wheels W' are arranged inwardly of the rear wheels W and said rear wheels W are spaced apart a distance whereby the same, when the machine is in use, closely approach the rows of plants at opposite sides of the row being treated. The device is particularly adapted for use in connection with cotton plants and in order that the wheels W will not break the plants, the outer end portion of each of the spindles 2 has secured thereto the upper end portion of a rod 6, said rod being disposed forwardly on an angle of substantially forty-five degrees and having its lower end closely approaching the ground line. As the device or machine advances, the rod 6 will serve to deflect the portions of the plants which may be extending in the path of travel of the adjacent wheel W.

Mounted upon the central portion of the frame F and adjacent the opposite sides thereof are the fan casings C each of which has depending therefrom a spout 7 of a length to closely approach the ground surface. The lower end portion of the spout 7 is continued by an inwardly directed nozzle 8. The casings C and the spouts 7 are so arranged that the nozzles 8 are spaced apart in a direction longitudinally of the frame F or in the direction of travel of the device or machine, so that the air blasts or currents discharging from the nozzles 8 will not interfere one with the other.

Arranged within each of the casings C is a fan 9 of a conventional type including a shaft 10 extending exteriorly of the casing. In advance of the casings C, the frame F supports a transversely disposed countershaft 11 in driven connection with an engine E preferably of an internal combustion type and which engine is suitably mounted upon the rear portion of the frame F. The extended portions of the shafts 10 of the fans 9 are in driven connection, as at 12, with the countershaft 11 whereby the desired air blasts or currents may be created.

Each marginal portion of the frame F in substantially transverse alinement with the spout 7 remote therefrom is provided with a depending rod 14, said rod being disposed through a vertically arranged bearing or sleeve 15 carried by the frame F so that said rod 14 may be raised or lowered as the requirements of practice may necessitate. The rod 14 is held in desired position or adjustment by a set-screw 16 threaded through a wall of the sleeve or bearing 15 and contacting with the rod 14.

The lower end portion of each of the rods 14 is provided with a cross head 17 disposed in a direction longitudinally of the frame F. Depending from the opposite end portions of the cross head 17 are the rods 18 slidably disposed through the upstanding brackets 19 carried by the top wall of a pan or hood P. Interposed between each of the brackets 19 and an end portion of the cross head 17 is an expansible member 20 herein disclosed as a coil spring encircling a rod 18 whereby the pan or hood P is constantly urged downwardly yet permitted to have an upward yielding movement as may be occasioned by inequalities or irregularities in the line or surface with which the pan or hood P may coact. The free or lower end portion of each of the rods 18 is provided with a head or enlargement 21 to prevent complete separation between said rod and its coacting bracket.

Each of the pans or hoods P comprises an elongated hollow member substantially rectangular in cross section with its longitudinal axis disposed lengthwise of the frame F. The inner face of the pan or hood P is open and the inner marginal portion of the bottom wall 22 of said pan or hood P is outwardly extended and curved downwardly, the free edge of said extended portion 23 contacting with and riding on the ground. The rear portion of the bottom wall 22 and also the top wall 24 adjacent the ends thereof or immediately adjacent the end walls 25 are provided with the openings 26, the top openings permitting the ingress or egress of air, as may be required, while the lower openings 26 are particularly adapted for use as discharging openings.

Depending from each side portion of the frame F and substantially in parallelism with an adjacent rod 14 is a pipe line 27 leading from a tank T supported by the forward portion of the frame F and which tank is adapted to contain a supply of gasoline or other liquid fuel. The lower portion of the pipe line 27 is freely disposed through the top wall 24 of a pan or hood P and terminates therein. As the top wall 24 of the pan or hood P is entirely disconnected from the pipe line 27, said pipe line offers no hindrance or obstruction to the vertical yielding movement of the pan or hood P which may occur.

The pipe line 27 within the pan or hood P is positioned at substantially the longitudinal center thereof and in close proximity to the inner open face of the pan or hood.

B denotes an elongated and substantially horizontally disposed burner provided at its central portion with a coupling 28 adapted to be fitted upon the lower or adjacent end portion of the pipe line 27, said coupling 28 being of such length as to permit the burner B to be vertically adjusted to a certain degree as the requirements of practice may prefer. Threaded through the wall of the coupling 28 is a set-screw 29 for co-action with the pipe line 27 in a conventional manner so that the burner B may be effectively held in its desired position with respect to the pipe line 27.

The burner B is provided with a plurality of longitudinally spaced tips 30 disposed outwardly with respect to the frame F or toward the back wall 31 of the pan or hood P so that the flames from said tips will be directed outwardly.

Intersecting the pan or hood P in close proximity to but spaced from the back wall 31 is a foraminous partition 32, preferably a wire mesh of desired gauge. The openings 26, hereinbefore referred to, are arranged between the back wall 31 and this partition 32.

In practice, the machine is adapted to straddle a row of plants to be treated, with a pan or hood P at each side of said row. The air blasts or currents emitted from the nozzles 8 operate to blow boll weevils or other insects lodged upon the plants, together with the squares, into the pans or hoods P. The air currents or blasts are sufficiently strong to blow the insects and squares against the partition 32 and as said insects and squares drop to the bottom wall 22, the same are consumed or destroyed by the flames from the adjacent burner B. The resultant ashes will be blown through the partition 32 and said ashes will be discharged from within the pan or hood P through the lower openings 26. By this means, the ashes can be used for fertilizing the ground.

My improved device is particularly adapted for use in the early spring so that the boll weevils or the like which may have survived the winter may be effectively destroyed. By destroying the insects at this time, an effective control is had over the resultant evils of such insects due to the fact that their destruction in the early spring offsets their prolific increase.

From the foregoing description it is thought to be obvious that an insect destroyer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described embodying a portable structure including a pan adapted to be positioned at one side of a row of plants, said pan comprising a hollow body having its inner face open, means carried by the structure adapted to be positioned at the opposite side of the plant row for directing a blast of air across said row and into the pan through the open face thereof, a burner arranged within the pan adjacent the open face thereof and provided with means to direct a flame toward the back wall of the pan, and a vertically disposed foraminous partition intersecting the pan and positioned inwardly of the back wall.

2. A device of the class described embodying a portable structure including a pan adapted to be positioned at one side of a row of plants, said pan comprising a hollow body having its inner face open, means carried by the structure adapted to be positioned at the opposite side of the plant row for directing a blast of air across said row and into the pan through the open face thereof, a burner arranged within the pan adjacent the open face thereof and provided with means to direct a flame toward the back wall of the pan, and a vertically disposed foraminous partition intersecting the pan and positioned inwardly of the back wall, certain of the walls of the pan between the partition and back wall being provided with openings.

3. A device of the class described embodying a portable structure, a rod depending from the structure and provided at its lower end portion with a cross head, rods depending from the cross head, a pan adapted to be positioned at one side of a row of plants, upstanding brackets carried by the pan, the rods depending from the cross head being slidably disposed through said brackets, and an expansible member surrounding each of said depending rods and interposed between a bracket and the cross head.

4. A device of the class described embodying a portable structure, a rod depending from the structure and provided at its lower end portion with a cross head, rods depending from the cross head, a pan adapted to be positioned at one side of a row of plants, upstanding brackets carried by the pan, the rods depending from the cross head being slidably disposed through said brackets, an expansible member surrounding each of said depending rods and interposed between a bracket and the cross head, said first named rod being vertically adjustable with respect to the portable structure, and means for normally holding said first named rod in a fixed position with respect to the portable structure.

In testimony whereof I hereunto affix my signature.

OTTO RANNEFELD.